United States Patent [19]
Delapierre

[11] 3,805,149
[45] Apr. 16, 1974

[54] METHOD OF LINEAR MEASUREMENT OF A VARIATION IN CAPACITANCE AND CORRESPONDING DIGITAL-DISPLAY DEVICE

[75] Inventor: Gilles Delapierre, Seyssinet-Pariset, France

[73] Assignee: Commissariat A L'Energie Atomique, Paris, France

[22] Filed: June 20, 1972

[21] Appl. No.: 264,508

[30] Foreign Application Priority Data
June 24, 1971 France .............................. 71.23030

[52] U.S. Cl. .............................................. 324/60 C
[51] Int. Cl. ....................... G01r 11/52, G01r 27/26
[58] Field of Search .................... 324/60 C, 60 R

[56] References Cited
UNITED STATES PATENTS

| 3,480,857 | 11/1969 | Bialko et al. | 324/60 R X |
| 3,042,859 | 7/1962 | Shillington | 324/60 C |
| 3,378,765 | 4/1968 | Hilsenrath et al. | 324/60 R |
| 3,530,379 | 9/1970 | Demerliac | 324/60 R |

*Primary Examiner*—Stanley T. Krawczewicz
*Attorney, Agent, or Firm*—Craig & Antonelli

[57] ABSTRACT

A fixed or variable capacitor is inserted in the circuit of an oscillator having an operating frequency which is inversely proportional to the value of the capacitor. The method consists in counting a constant number of periods of the oscillator, the resultant counting time being accordingly a linear function of the value of the capacitor.

6 Claims, 2 Drawing Figures

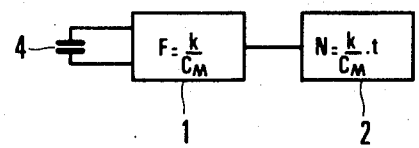
Fig: 1
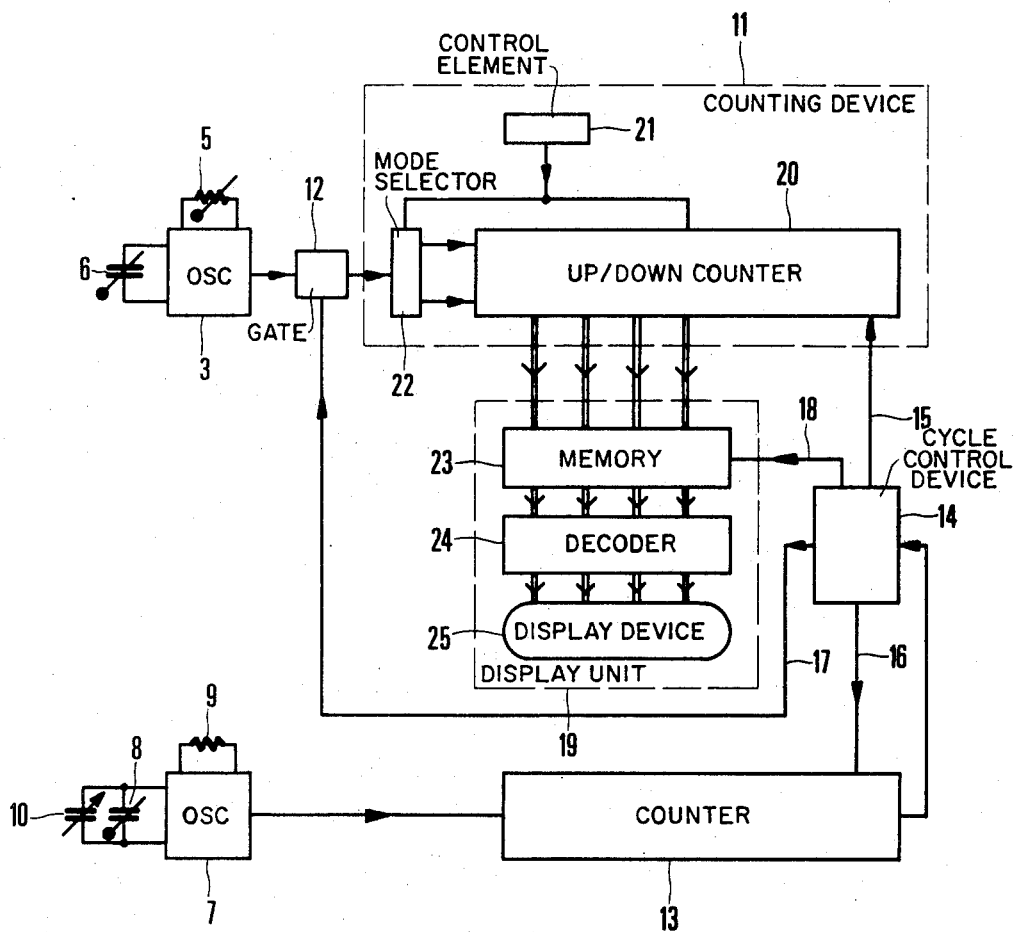
Fig: 2

METHOD OF LINEAR MEASUREMENT OF A VARIATION IN CAPACITANCE AND CORRESPONDING DIGITAL-DISPLAY DEVICE

This invention relates to a method of measurement of a capacitance and/or a variation in capacitance as applicable in particular to any physical quantity (displacement, permeability) which is represented by a capacitance and/or a variation in capacitance. The invention is also concerned with a device for measuring a variation in capacitance in which said method is carried into effect.

For the practical application of the invention, a capacitor which may be associated with a physical quantity is introduced into the circuit of an electric oscillator. This results in a frequency shift of the oscillator and said shift can be correlated with the capacitance of said capacitor.

In known devices of this type, a variation in capacitance does not result in a corresponding linear variation in the frequency of the oscillator. Moreover, the temperature drift of the oscillator causes a parasitic frequency shift which affects the accuracy of measurements.

The aim of the invention is to provide a method and a device which meet practical requirements more effectively than those of the prior art, especially insofar as the invention makes it possible to obtain on the one hand a linear measurement of a variation in capacitance and, on the other hand, a measurement which is insensitive to temperature drift.

To this end, the invention proposes a method of measurement of a capacitance and/or of a variation in capacitance, in which a fixed and/or variable capacitor is inserted in the circuit of an electric oscillator, wherein said method consists in selecting an oscillator having an operating frequency which is inversely proportional to the value of said capacitor and in counting a constant number of periods of said oscillator, the resulting counting time being accordingly a linear function of the value of said capacitor.

The method according to the invention has the advantage of converting the measurement of capacitance to a measurement of time which can be carried out with a very high degree of accuracy.

The invention further proposes a device for measuring a capacitance and/or a variation in capacitance, said device being employed to carry out the method aforesaid, characterized in that it comprises a reference oscillator $F_1$, a measuring oscillator comprising a capacitor corresponding to the value of said capacitance to be measured and having a frequency $F_2$ which is inversely proportional to said capacitance, a first counting device to which signals having a frequency $F_1$ are applied, a second counting device to which signals having a frequency $F_2$ are applied, a blocking circuit which delivers an order for stopping the processing of signals having a frequency $F_1$ by said first counting device when said second device has counted a constant number N of signals having the frequency $F_2$, display means which are connected at the output of said first counting device and record the state of said first device at the moment of appearance of said stopping order.

It is worthy of note that the device according to the invention permits elimination of temperature drift by making use of two oscillators and that a numerical display of the measured value can readily be obtained.

A more complete understanding of the invention will be gained from the following description of a device which constitutes one example of application and is given without any implied limitation. Reference is made in the description to the accompanying drawings, in which:

FIG. 1 is a schematic diagram of the invention;

FIG. 2 is an example of construction of the device according to the invention.

The practical application of the invention calls for the use of an electric oscillator having an operating frequency which is inversely proportional to the capacitance of a capacitor which is inserted in its circuit. The oscillator can advantageously be of the resistance-capacitance type.

In FIG. 1, an oscillator 1 to which is connected a capacitor 4 having a value $C_M$ delivers a frequency:

$$F = K/C_M$$

wherein K is a constant which is a function of the parameters of the oscillator.

A counter 2 which is connected to said oscillator counts during a time interval $t$ the signals having a frequency F, said signals having previously been shaped by a circuit which is not illustrated. The number of signals N recorded is:

$$N = t \cdot F$$

namely $$N = t \cdot K/C_M$$

If the counting operation is performed in such a manner that M is constant, $t$ becomes a function of F and therefore of $C_M$. Since in addition:

$C_M = K/M \cdot t$ it is found that any variation $C_M$ in the capacitance of the capacitor 4 results in a corresponding linear variation of $t$.

The example of construction which is presented in FIG. 2 carries this principle into effect. A resistance-capacitance oscillator 3 comprising a variable resistor 5 and a capacitor 6 having an adjustable value $C_0$ serves as a reference oscillator. A resistance-capacitance oscillator 7 comprising a resistor 9 and a capacitor 8 having an adjustable value $C_0$ serves as measuring oscillator. The capacitor 10 having a value of capacitance $C_M$ to be measured is connected in parallel with the capacitor having a value $C_0$ of the measuring oscillator.

The electric signals derived from the reference oscillator 3 are applied to a first counting device 11 via a gate 12, the design function of which will be explained in detail below. The signals derived from the measuring oscillator 7 are applied to a second counting device 13. The electric signals at the output of the two oscillators aforesaid may be shaped if necessary by means of circuits which are not shown in the drawings.

The output of the counting circuit 13 is connected to the input of a cycle-control device 14. This device has four outputs: the first output 15 delivers a reset order to the counting device 11. The second output 16 delivers a reset order to the counting device 13. The third output 17 transmits to the gate 12 a stopping order (closure of the gate) and finally, the fourth output 18 delivers by means of a display unit 19 connected to the output of the first counting device 11 an order for recording the state of said counting device.

As an advantageous feature, said first counting device 11 is constructed by means of a two-input up/down counter 20 provided with a display control element 21 and an operational mode selector 22. Said selector 22 has a first input connected to the output of the gate 12 and a second input connected to the display control element 21; said selector also has two outputs which are connected to the two inputs of the up/down counter.

The display control element has a double function: on the one hand, said element presets the up/down counter at a value which is determined as a function of the order of magnitude of the capacitance to be measured and, on the other hand, said element delivers to the selector 22 two logic levels (0 and 1) which enable it to select either the counting register or the deduction register of up/down counter 20. The logic level 1 will appear, for example, when the variation of $C_M$ is of increasing value and the logic level 0 will appear in the contrary case.

The display means 19 advantageously comprise a memory element 23 which is connected at the output of the counting device 11 and receives through said fourth output 10 of the cycle control device 14 said order for recording the state of the counting device 11. Said means also comprise a decoder 24 connected to the memory element 23 and a display device 25 which is connected to the output of the decoder and displays the value corresponding to the content of the counting device 11.

The principle of the device described in FIG. 2 is as follows. If $F_1$ and $F_2$ are respectively the frequencies of the reference and measuring oscillators, we have:

$$F_1 = K/C_o$$

$$F_2 = K/C_O + C_M$$

If the number of signals delivered respectively by each oscillator is counted in the devices 11 and 13 and if the sum or the difference is determined, we obtain:

$$N = N_2 \pm N_1 = t \cdot F_2 \pm t \cdot F_1.$$

wherein $N_1$ and $N_2$ are the number of signals counted respectively by the devices 11 and 13 and $N$ is the sum of said signals or the difference between these latter.

If the counting operation is now performed in such a manner that $N_2$ is constant, and t becomes a function of $F_2$, $N$ is expressed by:

$$N = N_2 (1 \pm F_1/F_2)$$

namely $$N = N_2 (2 + C_M/C_0$$

or $$N = -N_2 \cdot C_M/C_0$$

It will immediately be noted that the number of signals obtained is directly proportional to the value of the capacitance $C_M$ to be measured; it will therefore only be necessary to display this number after each counting cycle having a time-duration $t$ ($t$ being a function of $F_2$). Moreover, this display can be either an increasing or decreasing function of the capacitance.

The circuit according to the invention as described in FIG. 2 achieves a high degree of stability by making use of two oscillators. In fact, if we again take the expression on $N$ in the form:

$$N = N_2 (1 \pm K_1/C_O \cdot C_O + C_M/K_2)$$

wherein $K_1$ and $K_2$ represent the temperature drift of the oscillators 3 and 7, the temperature-dependent variation of N is given by:

$$\Delta N/N = \Delta K_1/K_1 - \Delta C_0/C_0 + \Delta(C_0 + C_M)/C_0 + C_M - \Delta K_2/K_2$$

Since as a rule $C_M << C_0$ it follows that:

$$\Delta N/N \approx \Delta K_1/K_1 - \Delta K_2/K_2$$

The variable resistor 5 has the precise object of permitting adjustment of the equality of the constants $K_1$ and $K_2$. There is thus obtained a circuit having a very low drift (matched oscillators).

By way of application of the foregoing, there will now be described a concrete example in which the design characteristics are as follows:

Variations in capacitance to be measured—0 to 10 pF
Resolution—0.01 pF
Linearity—0.1 percent
Possibility of positive-slope display irrespective of the direction of variation of the capacitance $C_M$.

Determination of the parameters of the assembly is carried out by means of two integrated oscillators of type SE 566 produced by Segnetics Corp. of Sunnyvale, California which perform the function of reference and measuring oscillator. Since the frequency distortion of these oscillators is 0.2 percent for ± 10 percent of excursion, it is therefore necessary to impose a limit corresponding to an excursion of 5 percent in order to satisfy the condition of linearity which is fixed at 0.1 percent, thereby determining:

$$C_0 = C_M \times 100/5 = 200 \text{ pF (when } C_M = 10 \text{ pF)}$$

The corresponding frequency of SE 566 oscillators is in this case of the order of 400 Khs.

A resolution of 0.01 pF entails the need for a display $$N = 1000 \text{ when } C_M = 10 \text{ pF}$$

hence $$N_2 = N \times C_0/C_N = 20,000$$

These parameters being determined, calibration of the assembly is obtained by regulating the capacitor $C_O$ of each oscillator until correspondence of the display N at 1000 is achieved for a value $C_M = 10$ pF.

The signals having a variable frequency $F_2$ of the oscillator 7 are then counted in the counting device 13 until the value 20,000 is attained. A pulse is then transmitted to the cycle control device 14 which delivers the following orders: stopping of counting of signals having a frequency $F_1$ by closure of the gate 12, storage at 23 of the state of the counting device 11, resetting of the two counting devices 11 and 13, whereupon the cycle begins again.

The use of the up/down counter 20 as a counting device is preferably warranted in either of the following cases:

$C_M$ varies from 0 to 10 pF and it is desired to display from 0 to 1000.

In this case, the display control element 21 on the one hand delivers a logic level (1 for example) which, by means of the operational mode selector 22, selects the counting function of the circuit 20 and, on the other hand, presets the circuit 20 at 20,000.

Thus, when $C_M = 0$, the state of the counter at the end of the cycle will be 40,000 and when $C_M = 10$ pF, it will be 41,000 (state of the circuit 20).

By reason of the fact that only the last four digits are displayed, a display of 0000 to 1000 has in fact been achieved.

C varies from 10 pF to 0 and it is desired to display from 0 to 1000.

In this case, the display control element 21 on the one hand delivers the logic level 0 which, by means of the operational mode selector 22, selects the deduction-count function of the circuit 20 and, on the other hand, presets the circuit 20 at 21,000.

At the end of a cycle, this puts:

in the case of $C_M = 10$ pF, the circuit 20 in the state 00000.

in the case of $C_M = 0$, the circuit 20 in the state 01000.

It is therefore observed that, irrespective of the direction of variation of $C_M$, the example described permits a digital display with a positive slope. This is highly advantageous in a large number of applications.

By way of example, if one of the plates of $C_M$ is stationary and the other plate is rigidly fixed to an object which moves at right angles to said plates, it is possible to measure the amplitude of this displacement. To this end, it is only necessary to establish the correspondence with N, this being achieved by replacing the variation of $C_M$ by the corresponding displacement.

Similarly, measurements of permeability or of relative humidity can be carried out. In this case, the plates remain stationary and any variation $C_M$ is represented by a variation in the dielectric of the capacitor. In accordance with the principles outlined above, there is obtained a linear correspondence between N and the variation in the dielectric.

It is readily apparent that the invention is not limited solely to the device hereinabove described but extends to any alternative arrangement which remains within the scope of the invention.

I claim:

1. A method of measurement of a capacitance and/or of a variation in capacitance, in which a fixed and/or variable capacitor is inserted in the circuit of an electric oscillator, wherein said method comprises selecting an oscillator having an operating frequency which is inversely proportional to the value of said capacitor, and counting a constant number of periods of said oscillator wherein the resulting counting time is a linear function of the value of said capacitor.

2. A system for measuring compacitance comprising a reference oscillator having a first frequency, a measuring oscillator having a capacitor corresponding to the capacitance to be measured electrically connected thereto, said measuring oscillator having a second frequency which is inversely proportional to the capacitance, a first counting means for receiving and counting the output signals of the reference oscillator, second counting means for receiving and counting the output signals of the measuring oscillator, blocking circuit means responsive to a predetermined count N of signals of said measuring oscillator by said second counting means for providing a stop output signal to said first counting means for stopping the processing of the signals of said reference oscillator, and display means connected at the output of said first counting means for recording the count of said first counting means at the time of receipt of the stop signal by said first counting means.

3. A system according to claim 2, wherein said reference oscillator and said measuring oscillator are resistance-capacitance type of oscillators.

4. A system according to claim 2, wherein said first counting means includes an up/down counter having two inputs, a display control element means for controlling the presetting of a count in said up/down counter and an operational mode selector means having two inputs and two outputs, said selector means having a first input connected to an output of said blocking circuit means and a second input connected to said display control element means, said selector means having the two outputs thereof connected to the two inputs of said up/down counter.

5. A system according to claim 2, wherein said reference oscillator and said measuring oscillator include adjustable resistance means for eliminating temperature drift of said oscillators.

6. A system according to claim 2, wherein said blocking circuit means is provided with one input and four outputs, said blocking circuit means having the input thereof connected to the output of said second counting means and being responsive to said second counting means reaching said predetermined count N corresponding to a predetermined number of signals of the second frequency from said measuring oscillator for providing a stop signal to said first counting means at a first output thereof and providing a record and display signal to said display means at a second output thereof, said blocking circuit means also providing reset signals to said first and second counting means at third and fourth outputs thereof, respectively.

* * * * *